United States Patent [19]

Yamamoto et al.

[11] Patent Number: 4,520,505
[45] Date of Patent: May 28, 1985

[54] CHARACTER READING DEVICE

[75] Inventors: Katsuyoshi Yamamoto; Haruo Mizukami; Hajime Nambu, all of Kanagawa, Japan

[73] Assignee: Mitsubishi Denki Kabushiki Kaisha, Tokyo, Japan

[21] Appl. No.: 447,828

[22] Filed: Dec. 8, 1982

[30] Foreign Application Priority Data

Dec. 23, 1981 [JP] Japan .................................. 56-208599
Jan. 14, 1982 [JP] Japan ..................... 57-4612

[51] Int. Cl.$^3$ ............................................... G06K 9/44
[52] U.S. Cl. ......................................... 382/55; 382/50; 382/52; 382/54
[58] Field of Search ......................... 382/55, 50, 54, 52

[56] References Cited

U.S. PATENT DOCUMENTS 3,196,398 7/1965 Baskin ..................... 382/55
3,688,266 8/1972 Watanabe et al. .................... 382/50
3,973,239 8/1976 Kakumoto et al. .................... 382/50
4,349,846 9/1982 Sekigawa ............................. 382/50

FOREIGN PATENT DOCUMENTS 1263667 3/1970 United Kingdom .

OTHER PUBLICATIONS

Jullian R. Ullmann, "Binarization Using Associative Addressing", Pattern Recognition, vol. 6, 1974, pp. 127–135.
M. R. Bartz, "The IBM 1975 Optical Page Reader, Part II: Video Thresholding System", IBM J. Res. Develop., 9-1968, pp. 354–363.

Primary Examiner—Leo H. Boudreau
Assistant Examiner—Joseph Mancuso
Attorney, Agent, or Firm—Sughrue, Mion, Zinn, Macpeak, and Seas

[57] ABSTRACT

In a system for identifying hand-written characters, the read character is binary-coded with a high threshold value and a low threshold value, picture elements whose density levels are between the high and low threshold values are subjected to thinning, and the picture elements of the thinned character pattern having density levels lower than the high threshold level are redetermined as to black or white levels from the contrast of each picture element with respect to the surrounding picture elements, so that noise can be eliminated without cutting blurred portions of the character or collapsing portions of the character.

7 Claims, 11 Drawing Figures

```
            3 2 2 2 2 2 1
      1 5 D C C C C D C 4 3           3
      4 D 5 3 2 2 2 3 3 8 C 2
        5 D 3             2 3 C 2
      3 C 6 2             2 4 A 3
        4 D 5             1 8 2
    1 3 6 E 5 2           1 3 1
  2 3 4 6 F 5 2 1           2
    1 3 6 E 5 1           2 1
        4 D 4             1 4 1
        3 C 3           1 6 1
        3 C 2           2 9 2
      1 6 C 2         2 C 4
        4 C 2       1 C 3
        4 D 3       3 C 2
        3 D 3     2 C 3
        3 D 3 1 C 4 1
        2 C 4 5 D 3
        2 7 D D 6 1                 1
        1 6 E A 4               1 3 2
        1 A F 8 2               1 4 4 1
        2 E E 6 2               1 3 3 1
        3 E C 5 1                 2 1
        3 D 4 C 5
      1 D 5 4 C 5
      2 D 3 3 C 5
      3 C 2 3 C 4
      3 C 5 3 C 2
      3 A C C 3
        2 3 2
```

| $X_1$ | $X_2$ | $X_3$ | $X_4$ | $X_5$ |
|---|---|---|---|---|
| $X_{16}$ | | | | $X_6$ |
| $X_{15}$ | | $X_0$ | | $X_7$ |
| $X_{14}$ | | | | $X_8$ |
| $X_{13}$ | $X_{12}$ | $X_{11}$ | $X_{10}$ | $X_9$ |

CHARACTER READING DEVICE

BACKGROUND OF THE INVENTION

This invention relates to a character reading system in which a character of low quality, portions of which are blurred or collapsed, can be read with high accuracy.

In a character reading system, one of the essential factors affecting the reading accuracy is the print quality of an input character. In the case of a printed character, a portion of the character line may be blurred, collapsed or malformed when the type surface is dirty, the printing pressure is unsatisfactory, or the ink ribbon is irregular in density. In the case of a hand-written character, the character line may be partially blurred, collapsed or malformed when the writing tool is unsatisfactory, the writing speed is variable, or the way the person writes characters is unacceptable. Especially when characters are written with a ball-point pen, because of the irregular rotation of the ball, the ink does not flow out smoothly, as a result of which the characters are frequently blurred.

As is apparent from the numeral "0" and the character "C" for instance, in order to read a character, it is most essential to determine how the character lines are separated or connected. Accordingly, the accuracy of reading a character, the character lines of which are blurred or collapsed as described above, is, in general, low.

In order to read a character of low quality, a character reading system has been proposed, as disclosed in IBM J. Res. Develop. 1975, p. 354–363 by M. R. Bartz, in which a threshold value is calculated from the average density level and average line width of a character pattern, and one-dimensional local contrast along the character scanning direction is utilized to convert the input character pattern into binary data, e.g., black and white picture elements. This system is quite effective in reading a printed character with noise formed by splashes of ink and a lower case character, the character lines of which are liable to collapse. However, since the system is provided mainly in order to improve the accuracy of reading printed characters, the system is not so effective in reading hand-written characters in which the density level and the line width are considerably variable.

In order to eliminate the drawbacks accompanying this system, two-dimensional local contrast has been utilized as disclosed in Pattern Recognition, Pergamon Press 1974, Vol. 6, p. 127–135, by J. R. Ullmann. More specifically, when the difference in density level between one picture element and picture elements near this picture element in a two-dimensional plane is larger than a predetermined threshold value, the picture element is regarded as a black picture element; and when the difference is not larger than the threshold value, the picture element is regarded as a white picture element. This system is effective in reading a character, the lines of which are relatively low in density or a portion of which is relatively high in density. However, the system is disadvantageous in that when the character line is partially irregular in density, a portion of the character line is determined to consist of white picture elements, or a light stain is considered as black picture elements.

In another known character reading system, as disclosed in British Pat. No. 1,263,467 to Watanabe, a threshold value of high density level and a threshold value of low density level are provided, and when a picture element is connected with a picture element which is determined to be a black picture element by binary-coding with the high threshold value, and is itself determined to be a black picture element using the low threshold value, it is determined to be a black picture element. This system is advantageous in that it can readily eliminate a localized noise element spaced from the character and it is effective in reading a character the lines of which are blurred. However, the system is disadvantageous in that it cannot eliminate a noise area connected to the character, and it is not effective in reading a character, a character line of which is collapsed. In this system, the setting of the low threshold value is difficult. If the low threshold value is increased, the system is not effective in reading a character having blurred line portions. If, on the other hand, the low threshold value is decreased, the system is not effective in reading characters having collapsed line portions. Especially in a character of low quality, the grey level of collapsed line portions is, in general, higher than that of blurred line portions, and accordingly, it is impossible for the system to correctly convert both these portions into black and white picture elements.

The above-described conventional systems each include at least one drawback. In common with these systems is that the fact that a character formed with character lines is not reflected at all or not sufficiently reflected. As was described above, character information is essentially transmitted by the connection and separation of character lines, and the widths of character lines are not essential in reading the character. Accordingly, a character reading system should determine blurred line portions as black picture elements and collapsed line portions as white picture elements, to thereby correctly detect the connection of the character lines. For this purpose, the system should utilize the fact that a character pattern, unlike an ordinary figure, is a special pattern made up of character lines.

SUMMARY OF THE INVENTION

In view of the foregoing, an object of this invention is to provide a character reading system in which, after a binary-coded character pattern obtained using a low threshold value is thinned under certain conditions, local processing is effected to determine whether or not a picture element is a part of the character line, whereby portions of the character line are positively detected and a character of low quality may be read with high accuracy.

In the character reading system according to the invention, a multi-level character pattern provided by scanning means adapted to scan a character and to subject the character thus scanned to photo-electric conversion is binary-coded into picture elements of "1" and "0" levels according to a first threshold value. A second threshold value higher than the first threshold value is set, and those picture elements of "1" level which have density levels lower than the second threshold value are subjected to thinning. Each of the picture elements of "1" level having density levels lower than the second threshold level are compared in contrast with the surrounding picture elements to determine whether the level of the picture element is to be maintained at "1" or changed to "0." Thus, the system according to the invention can accurately read a character of low quality in which the character lines are particularly blurred, unnecessarily connected or collapsed, or where noises such as stains are formed.

The nature, principle and utility of the invention will become more apparent from the following detailed description when read in conjunction with the accompanying drawings.

DETAILED DESCRIPTION OF THE PREFERRED EMBODIMENTS

Figures 1, 2:
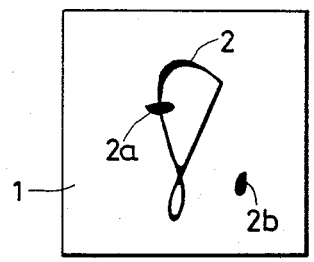
FIG. 1 is an explanatory diagram showing one example of a character pattern to be read.
FIG. 2 is an explanatory diagram showing the character pattern expressed in multi-density-levels.

FIG. 1 shows one example of a character pattern 2 of the numeral "8", which is hand-written on a recording medium 1 such as a piece of paper. In FIG. 1, reference characters 2a and 2b designate noise formed by dirt or dust on the recording medium 1. The noise 2a is on the character line, while the noise 2b is remote from the character line. The character pattern 2 is unsatisfactory in configuration and in print quality. The upper portion of the character pattern is blurred, and the loop-like lower portion is malformed and collapsed. It is considerably difficult for a conventional system to eliminate the noises 2a and 2b without cutting the blurred portion and without collapsing the loop portion. However, this character pattern is most suitable for clarifying the effects of this invention.

FIG. 2 is a multi-level character pattern 3 which is obtained by indicating the density levels of the character pattern 2 in sixteen (16) steps. The density levels are expressed by the hexa-decimal numbers "0" through "9" and "A" through "F". The highest density level is expressed by "F", and the lowest density level by "0." However, for clarity in illustration, "0" is replaced by blanks ("0" is not shown).

Figure 3:
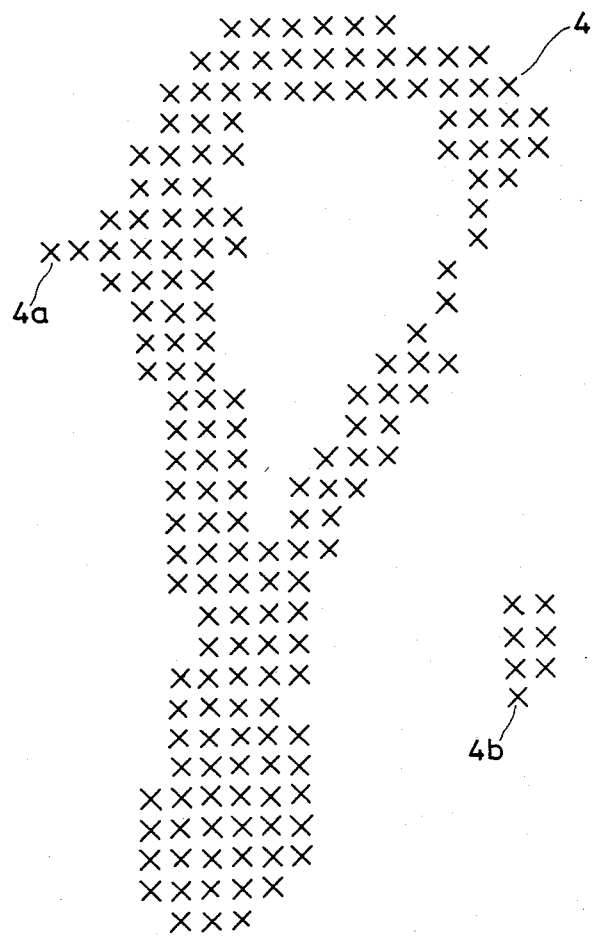
FIG. 3 is an explanatory diagram showing the character pattern binary-coded with a low threshold value.

FIG. 3 shows a binary character pattern 4 obtained by binary-coding the multi-level character pattern 3 with a low threshold value $TH_L$. In this case, the value $TH_L$ is two (2), the picture elements whose density levels are at the threshold value $TH_L$ or higher are regarded as black picture elements, and the remaining picture elements are regarded as white picture elements. Hereinafter the black picture elements will be represented by the mark X and the while picture elements by blanks, unless otherwise specified. In the binary character pattern 4, the threshold value is low as described above. Accordingly, the blurred portion is not eliminated, the loop portion is collapsed and the noises 4a and 4b appear clearly.

Figure 4:
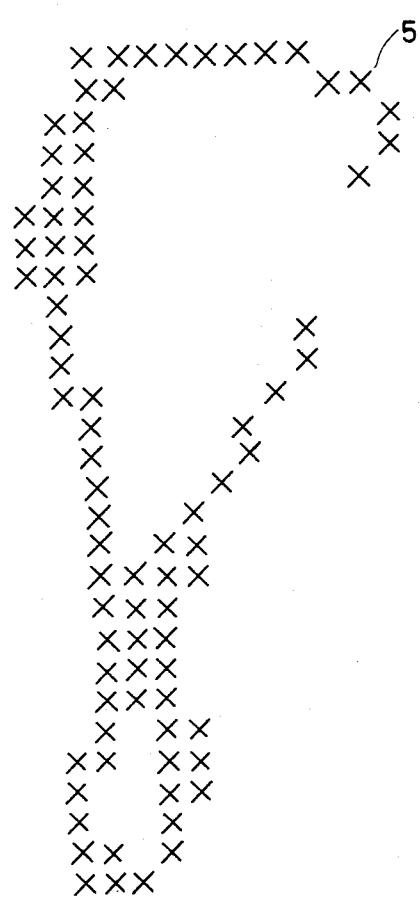
FIG. 4 is an explanatory diagram showing the character pattern binary-coded with a high threshold value.

FIG. 4 shows a binary character pattern 5 obtained by binary-coding the multi-level character pattern 3 with a high threshold value $TH_H$. In this case, the threshold value $TH_H$ is 5, and the picture elements whose density levels are at the threshold value $TH_H$ or higher are regarded as black picture elements, while the remaining picture elements are regarded as white picture elements. In the binary character pattern 5, the threshold value is high as described. Accordingly, the noise areas are eliminated, and the lower loop appears clearly; however, the blurred portion of the upper loop is cut.

Figure 5:
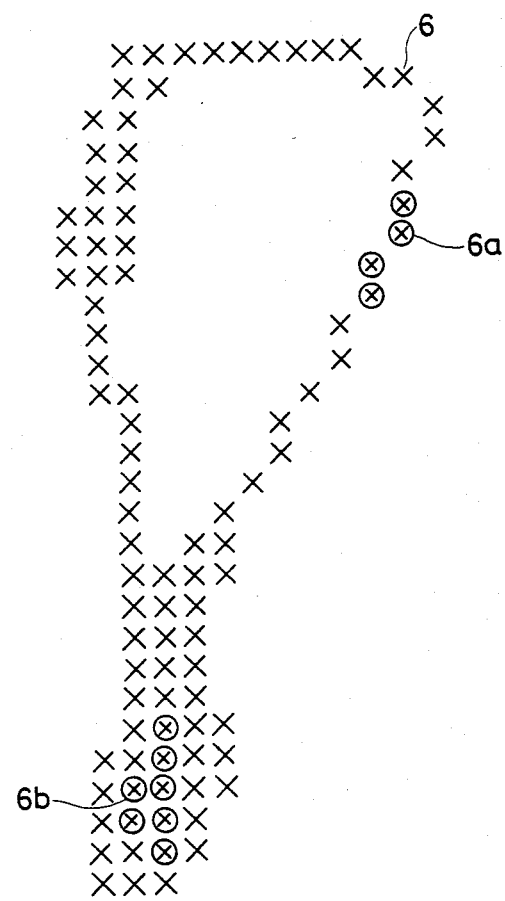
FIG. 5 is an explanatory diagram showing the character pattern subjected to thinning.

FIG. 5 shows a thinned character portion 6 which is obtained by thinning the binary character pattern 4 according to a system proposed by the invention. The technique of thinning is well known by those skilled in the art, and can be realized by using a method such as proposed by E. S. Deutsch ("Thinning algorithms on rectangular, hexagonal, and triangular arrays", Communications of the ACM, Vol. 15, No. 9, pp. 827–837 (1972)). The object here is not to obtain a thinned pattern in which a line width corresponds to one picture element, but to eliminate noise with character lines nonetheless maintained connected. Therefore, the aforementioned thinning method is modified as follows:

(1) Only those black picture elements having density levels lower than the high threshold value $TH_H$, are removed.

(2) An end point holding condition is eliminated.

(3) A solitary point holding condition is also eliminated.

(4) Thinning is effected beginning with picture elements lowest in density level.

With respect to paragraph (4) above, the ridge of density level of a character line remains as black picture elements. Therefore, the points (x) of the thinned character pattern 6, which are change points for preventing deformation of the character configuration, are black picture elements, the density levels of which are smaller than the threshold value $TH_H$, the picture elements 6a in the blurred portion of the upper loop are not removed in order to maintain connection of the picture elements, and the picture elements 6b in the lower loop are maintained as black picture elements as they are in the character line. Since the end point holding condition and the solitary point holding condition are eliminated as described above, the two noises are removed. Thus, the object of this invention can be achieved by changing the black picture elements 6b in the lower loop into white picture elements. The black picture elements 6a and 6b are at a ridge and valley of density gradation, respectively. Therefore, whether these picture elements should be white picture elements or black picture elements can be most suitably determined by detecting the contrast of these picture elements to the surrounding picture elements. If the picture elements of the character pattern are classified into white picture elements and black picture elements merely by the utilization of contrast as described with respect to the prior art, various difficulties occurs, for instance, because of irregularities in density. However, these difficulties can be eliminated by limiting the picture elements to those at the ridges and valleys of density gradiation, and accordingly a considerably good effect can be expected.

Figures 6, 7:
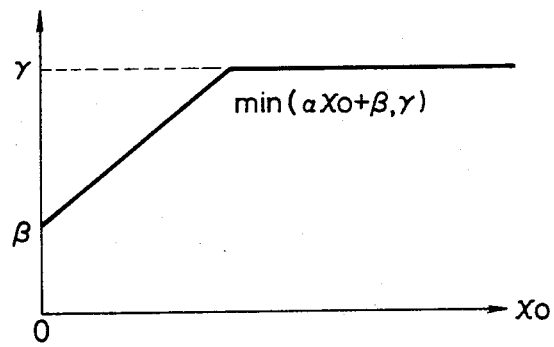
FIG. 6 is an explanatory diagram showing one example of a local processing mask.
FIG. 7 is a diagram showing one example of a function for obtaining contrast data.

FIG. 6 shows one example of a local processing mask for contrast detection. In FIG. 6, reference character $X_0$ designates the central picture element, and $X_1$ through $X_{16}$, surrounding picture elements which are spaced by two squares from the central picture element $X_0$. A variety of methods of obtaining values for contrast have been proposed in the art; however, in order to eliminate the effect of density irregularity, the following method will be employed in the invention by way of example.

A contrast C is represented by the following expression:

$$C = \min(\alpha x_0 + \beta, \gamma) - \sum_{i=1}^{16} f(x_0, x_i)$$

$$f(x_0, x_i) = \begin{cases} 1 & \text{(in the case of } x_i > x_0) \\ 0 & \text{(in the other cases)} \end{cases}$$

where $x_0$ is the density level of the picture element $x_0$, $x_i$ ($i=1$ to 16) is the density level of each of the picture elements $X_1$ through $X_{16}$, and $\alpha, \beta$ and $\gamma$ are constants which are not negative.

The term $\min(\alpha x_0 + \beta, \gamma)$ is a function as shown in FIG. 7, and $$\sum_{i=1}^{16} f(x_0, x_i)$$

is the number of picture elements which, among the picture elements $X_1$ through $X_{16}$, are higher in density level than the picture element $X_0$. Therefore, the contrast C is small at a valley of density gradiation and high at the ridge. Thus, the picture element $X_0$ will be made to remain black when the contrast C is higher than a predetermined value $\delta$, and the picture element $X_0$ will be converted into a white picture element in the other cases. The constants $\alpha$, $\beta$, $\gamma$ and $\delta$ are set to most suitable values through experiment on actual character patterns. The size of the local processing mask for determining contrasts, as shown in FIG. 6, is determined from an average character line width. For instance, the dimension of one side of the mask is the average character line width $+2$.

Figure 8:
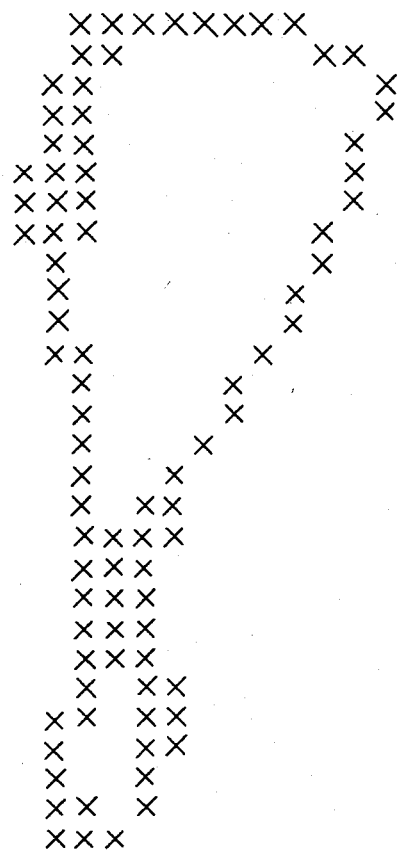
FIG. 8 is an explanatory diagram showing the character pattern as finally provided.

FIG. 8 shows a final character pattern obtained according to a method in which, with $\alpha=1$, $\beta=6$, $\gamma=9$ and $\delta=4$, the black picture elements 6a and 6b of the thinned character pattern 6 are subjected to black-/white decision. The picture elements 6a are at the ridge of a density gradiation. Therefore, the contrast C is higher than six (6), and the picture elements 6a remain black. On the other hand, as the picture elements 6b are in the valley, the contrast C is lower than two (2), and the picture elements 6b are converted into white picture elements. Thus, in the final character pattern, the noise areas are eliminated, the blurred portion is maintained continuous, and the lower loop appears clearly. That is, the character pattern is remarkably improved in quality.

Figure 9:
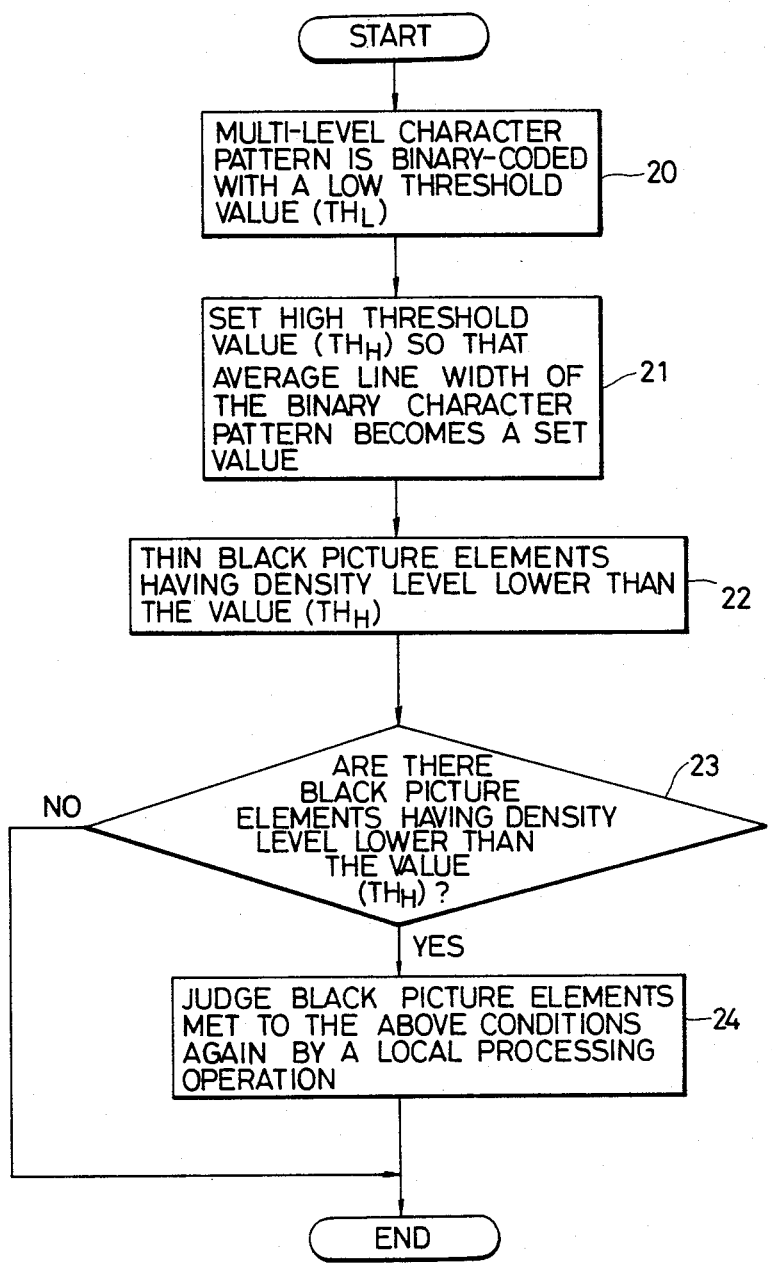
FIG. 9 is a flow chart showing an operating procedure.

FIG. 9 is a flow chart provided from a programming viewpoint, to facilitate understanding of the above-described procedure.

In Step 20, a multi-level character pattern which is provided according to a method in which the character is scanned and subjected to photo-electric conversion is binary-coded with a low threshold value $TH_L$. In Step 21, a high threshold value $TH_H$ is determined so that the average line width of the binary character pattern has a set value. In Step 22, the black picture elements having density levels lower than the high threshold value $TH_H$ are thinned. In Step 23, it is determined whether or not there are black picture elements having density levels smaller than the high threshold value $TH_H$. If the result is "no", then the operation is ended. If the result is "yes", the acceptability of the black picture elements satisfying the above condition is decided by local processing as described above, and the operation is ended.

Most characters to be read are satisfactory in quality. Accordingly, a character pattern of satisfactory quality scarcely includes black picture elements having density levels lower than the high threshold value $TH_H$ after being thinned. In this case, therefore, the local processing operation utilizing the contrast calculation can be eliminated, and the processing time may be reduced by as much.

Now, the selection of the two threshold values $TH_L$ and $TH_H$ will be described. According to the invention, the degree of freedom in determining the threshold values is large, and the threshold values can be relatively freely determined irrespective of character qualities, however, the low threshold value $TH_L$ should be lower than the density level of a blurred portion of a character line, or higher than the density level of a recording medium which is clean. This value can be readily obtained through experiments on a suitable number of character patterns.

The high threshold value $TH_H$ should be higher than the density level of a collapsed portion of a character line, or the density level of a contact point of two parallel lines, and should be selected such that no character line disappears. If the high threshold value is excessively high, the character pattern may be contracted to eliminate the character line because the end point holding condition is eliminated. An excellent method of determining the high threshold value $TH_H$ is as follows: First, measure the average line width w of the binary character pattern 5 in FIG. 4, and then select the high threshold value $TH_H$ so that the value w is closest to a predetermined average line width W, i.e., a set value W. That is, by varying the value $TH_H$, a threshold value $TH_H$ is obtained by which the difference d between W and w, $d = |W - w|$ is a minimum.

Figure 10:
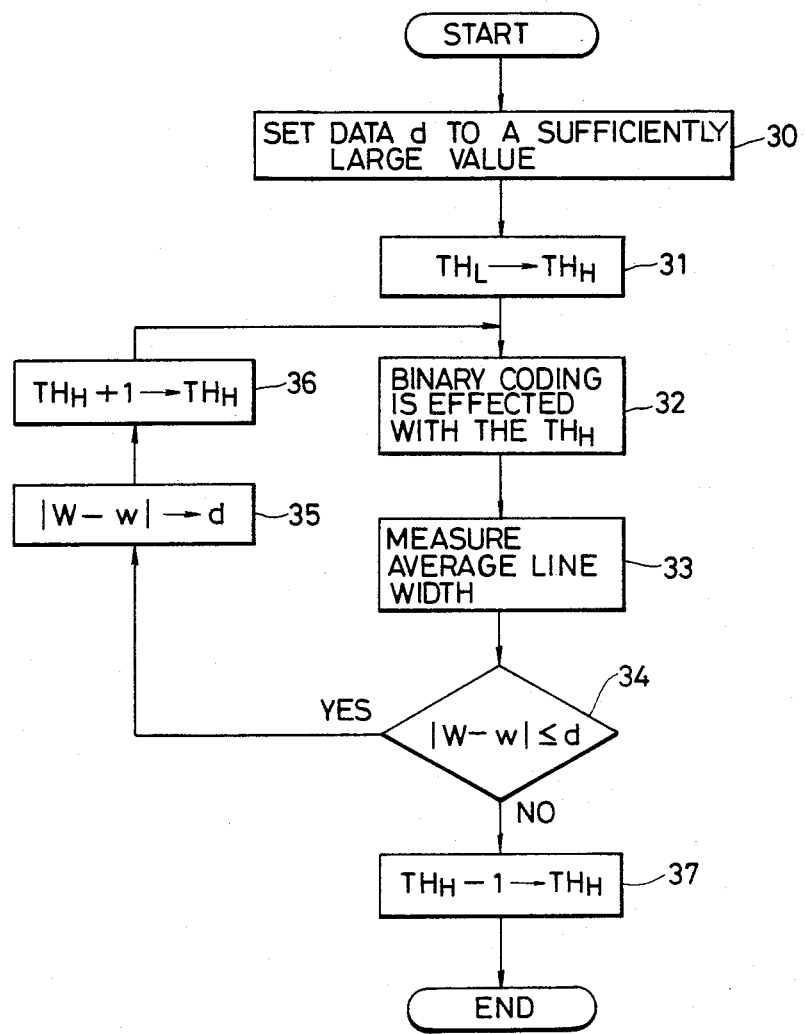
FIG. 10 is a flow chart showing the procedure of obtaining the average line width of a character.

FIG. 10 is a flow chart provided from a programming view-point, showing the method of determining the threshold value. In Step 30, data d is set to a sufficiently large value. In Step 31, $TH_H$ is employed instead of $TH_L$. In Step 32, binary-coding is effected using $TH_H$. In Step 33, the average line width w is measured. In Step 34, $|W - w| \leq d$ is determined. When the result of determination is "yes", then in Step 35 $|W - w|$ is set to d, and in Step 36 $(TH_H + 1)$ is employed as $TH_H$ and the operation is returned to Step 32. Thereafter, Steps 33 and 34 are carried out. If, in Step 34 the result of determination as to $|W - w| \leq d$ is "no", then in Step 37 $(TH_H - 1)$ is employed as $TH_H$, and the operation is ended. The method of measuring the average line width is well known to those skilled in the art, and can be realized, for instance, according to a method proposed by M. R. Bartz ("The IBM 1975 Optical Page Reader, Part II: Video Thresholding System", IBM Res. Develop, pp. 354–363 (1968)). In another example of a method of determining the high threshold value, the value $TH_H$ is obtained from the average density $\bar{v}$ of the multi-level character pattern as shown in FIG. 2 as follows:

$$TH_H = a \cdot \overline{v} - b$$

where a and b are constants, and $\overline{v}$ is defined by the following equation:

$$v = Vi/N$$

where Vi is the density level of a point whose density level is not "0", and N is the number of such points.

In FIG. 2, $\overline{v}=5.4$. In this embodiment, $a=1.5$ and $b=3$. However, these values should be obtained through experiment, similarly as in the case of $\alpha$, $\beta$, $\gamma$ and $\delta$.

Figure 11:
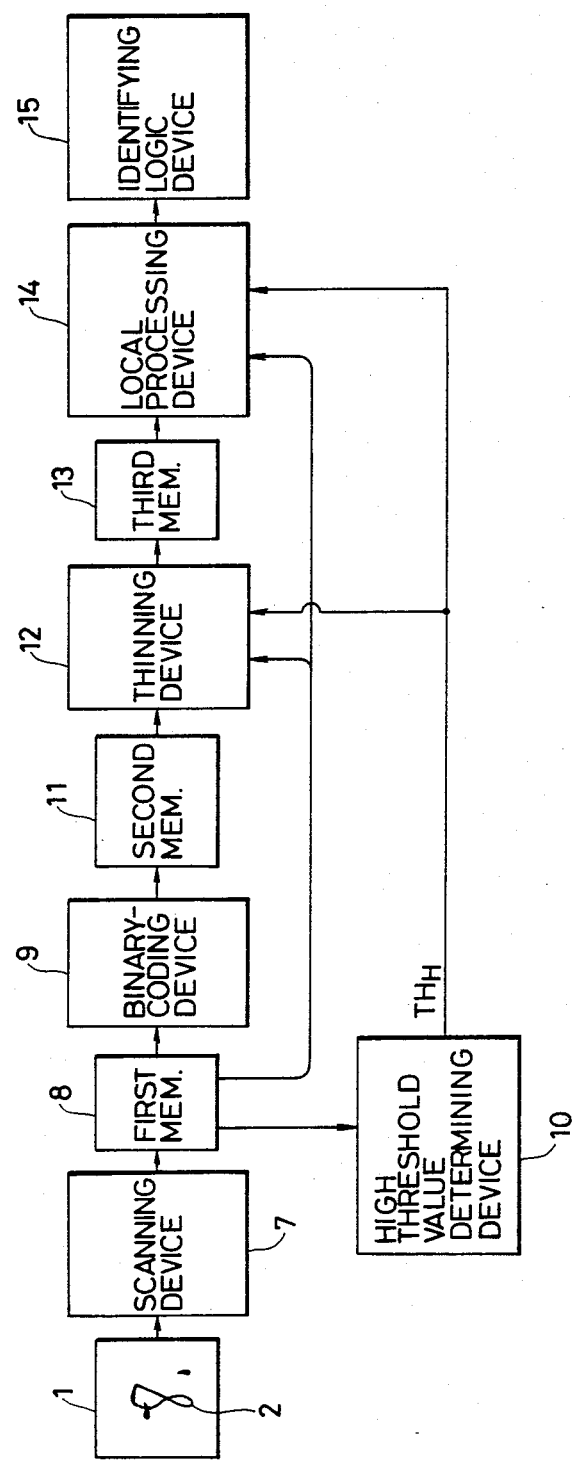
FIG. 11 is a block diagram showing a character reading device according to this invention.

FIG. 11 shows one example of the arrangement of an apparatus for practicing the above-described method according to the invention.

In FIG. 11, reference numeral 7 designates a scanning device; 8, a first memory device for storing a multi-level character pattern; 9, a binary-coding device; 10, a high threshold value determining device; 11, a second memory device for storing a binary character pattern; 12, a thinning device; 13, a third memory device for storing a thinned character pattern; 14, a local processing device; and 15, an identifying logic device for identifying characters. The scanning device 7 comprises a lamp, a lens and a semi-conductor optical sensor (not shown). The character pattern 2 on the recording medium 1 is converted into electrical signals proportional to the densities by the scanning device 7. The electrical signals are converted into digital signals in sixteen steps representing density levels, and are applied to the first memory device 8. In the binary-coding device 9, the multi-level character pattern 3 in the first memory device 8 is converted into a binary (white and black) character pattern with the low threshold value $TH_L$, and is applied to the second memory device 11. In the thinning device 12, the binary character pattern 4 in the second memory device 11 and the multi-level character pattern 3 in the first memory device 8 are used, and the black picture elements having density levels smaller than the high threshold value $TH_H$ determined by the high threshold value determining device 10 are subjected to thinning, the result of which is delivered to the third memory device 13. Then, in the local processing device 14, with respect to the black picture elements of the thinned character pattern 6 in the third memory device 13 having density levels smaller than the threshold value $TH_H$, contrast data are obtained with reference to the multi-level character pattern in the first memory device 8, and the acceptability of the black picture elements is determined. The final character pattern obtained through the above-described procedure is identified by the identifying logic device 15.

In the above-described embodiment, individually operating means such as the binary-coding device, the thinning device and the local processing device are combined; however, the invention is not limited thereto or thereby. That is, a part of or all of the individual means may be replaced by a processing unit.

While the invention has been described with reference to hand-written characters, the technical concept of the invention may be applied to the case where printed or otherwise formed characters, or symbols similar to characters, are read.

What is claimed is:

1. A character reading device comprising:
   scanning means for scanning a character and subjecting said character to photo-electric conversion to form a multi-level character pattern having more than two density levels;
   binary-coding means for binary-encoding said multi-level character pattern into picture elements of high and low levels according to a first threshold value, said binary-coding means thereby selecting picture elements of high levels;
   means for determining a second threshold value higher than said first threshold value;
   means for thinning those of the high level picture elements selected by said binary-coding means, the unencoded density levels of which are lower than said second threshold value, to form a thinned character pattern; and
   means for comparing the level of those picture elements of said thinned character pattern, the density levels of which are lower than said second threshold value, with the levels of the picture elements surrounding said picture element for contrast, to determine whether the level of said picture elements is to be maintained at said high level or changed to said low level.

2. A character reading device as claimed in claim 1, in which said picture element of high level and said picture element of low level are a black picture element and a white picture element, respectively.

3. A character reading device as claimed in claim 1, in which said second threshold value is determined such that an average line width of the binary pattern of the character has a predetermined value.

4. A character reading device as claimed in claim 1, in which said first threshold value is lower than the density level of a blurred portion of a character line, and higher than the density level of a clean recording medium.

5. A character reading device as claimed in claim 1, in which said second threshold value, being $TH_H$, is obtained from the following equation:

$$TH_H = a \cdot \overline{v} - b$$

where a and b are constants, and $\overline{v}$ is the average density of a multi-level character pattern and is represented by the following expression:

$$v = \Sigma Vi/N$$

where
   Vi is the density level of a point in the pattern whose density level is not zero, and
   N is the number of such points.

6. A character reading device, comprising:
   scanning means for scanning a character, to subject a scanning surface thereof to photo-electric conversion and to divide said surface into picture elements;
   first memory means for storing outputs provided by said scanning means, as digital multi-level signals having more than two density levels, in correspondence to the arrangement of said picture elements;
   second memory means for storing said multi-level digital signals after binary-encoding thereof into high and low level bits according to a first threshold value;
   third memory means for storing those contents of said second memory device remaining after thinning those contents corresponding to elements having unencoded density levels smaller than a second threshold value; and local processing means for calculating, with respect to those contents of said first memory device which correspond to the high level bits in said third memory device which are smaller than said second threshold value, the contrast of each picture element with respect to picture elements surrounding said picture element, and for maintaining the levels of those picture elements having calculated contrasts higher than a predetermined value at said high level, and for converting the levels of the remaining picture elements to said low level.

7. A method of reading characters, comprising;

subjecting a character to photo-electric conversion to form a multi-level character pattern having more than two density levels;

binary-encoding said pattern using a first threshold level, to form a pattern of elements having high and low values and determining a second, higher, threshold level;

selectively thinning those elements of the binary-encoded pattern having corresponding unencoded density levels lower than said second threshold level;

comparing the level of remaining elements having unencoded values lower than said second threshold level with the unencoded levels of elements surrounding said remaining elements for contrast; and converting those elements not having a contrast higher than a predetermined value, to said low value.

* * * * *